United States Patent [19]

Kobayashi et al.

[11] Patent Number: 4,494,843
[45] Date of Patent: Jan. 22, 1985

[54] AUTOMATIC FILM REWIND METHOD FOR CAMERA

[75] Inventors: Takashi Kobayashi, Tsuru; Takeshi Inagaki, Hachioji; Hiroshi Takahashi, Hachioji; Takayuki Ohisa, Hachioji, all of Japan

[73] Assignee: Konishiroku Photo Industry Co., Ltd., Japan

[21] Appl. No.: 434,627

[22] Filed: Oct. 15, 1982

[30] Foreign Application Priority Data

Oct. 19, 1981 [JP] Japan .................................. 56-167437

[51] Int. Cl.$^3$ .......................... G03B 1/60; G03B 17/36
[52] U.S. Cl. .................................... 354/214; 354/217
[58] Field of Search ................ 354/214, 217, 218, 173

[56] References Cited

U.S. PATENT DOCUMENTS

| | | | |
|---|---|---|---|
| 4,299,466 | 11/1981 | Harvey | 354/214 |
| 4,362,370 | 12/1982 | Iwata et al. | 354/217 |
| 4,367,026 | 1/1983 | Terada et al. | 354/217 |
| 4,400,074 | 8/1983 | Akiyama et al. | 354/214 |
| 4,416,525 | 11/1983 | Chan | 354/214 |
| 4,419,001 | 12/1983 | Tominaga et al. | 354/214 |

*Primary Examiner*—Russell E. Adams
*Attorney, Agent, or Firm*—Finnegan, Henderson, Farabow, Garrett & Dunner

[57] ABSTRACT

A method for automatically rewinding the film in a camera having a battery-powered automatic film rewinder, including a motor, a microprocessor, a control circuit, a timer, a microswitch associated with a film frame counter and a microswitch associated with a sprocket. The method comprises the steps of: determining from the time being taken to advance a single frame of film, whether a first film winding abnormality is occurring; determining whether the abnormality is caused by a deterioration in the power source for the automatic film winding mechanism; determining from the time being taken to advance a single frame of film, whether a second film winding abnormality is occurring; determining whether the second winding abnormality is occurring coincidentally with the film being in the vicinity of the last frame of film on the film roll; and rewinding the film only upon determining that the second film winding abnormality is occurring coincidentally with the last frame of exposed film being in the vicinity of the last frame of film on the film roll.

8 Claims, 9 Drawing Figures

FIG. 1
PRIOR ART
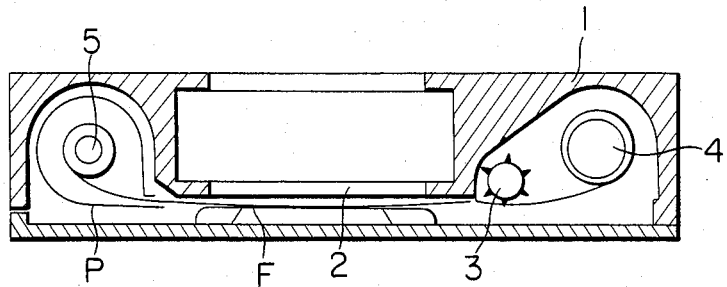
FIG. 2(a)
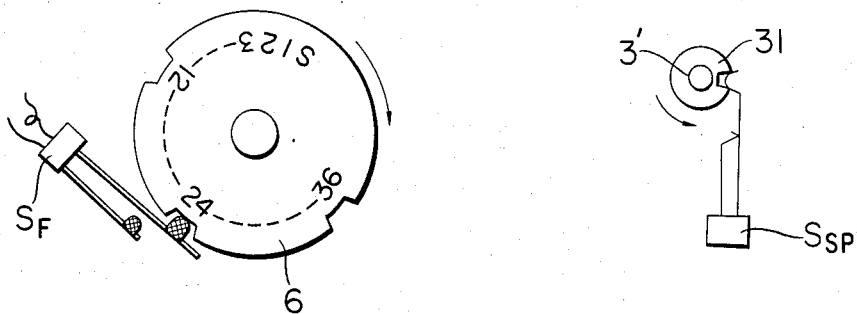
FIG. 3
FIG. 2(b)
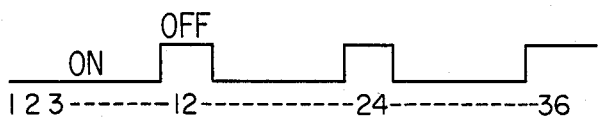

AUTOMATIC FILM REWIND METHOD FOR CAMERA

BACKGROUND OF THE INVENTION

1. Field of the Invention

The present invention relates to an automatic film-rewinding camera, and more particularly to a method governing automatic rewinding of film in a camera in which a battery-powered motor is used to automatically advance and rewind the film in the camera.

2. Description of the Prior Art

Reference initially will be made to FIG. 1, which shows a camera capable of automatically winding and rewinding the film loaded in the camera. FIG. 1 shows a cross-sectional view of a camera body 1 loaded with a perforated film F contained in a film cartridge P. One end of film F is affixed to a cartridge spool 5. Film F is taken up around a take-up spool 4 in such a manner that the perforations of the film are engaged with a sprocket 3 after passing through a film exposure opening 2. The driving force of a motor (not shown) powered by a battery (not shown) is transmitted to take-up spool 4 or to take-up spool 4 and sprocket 3 so as to wind up film F. Each of the frames on the film thus is displaced as sprocket 3 rotates.

At the moment when the shutter of a camera is released, a frame of film positioned behind the shutter is exposed to light. When the exposure is completed, a start signal for advancing the film is generated by the control circuit and transmitted to a timer. At the same time, the control circuit sends a motor driving signal to the motor to advance the film for just one frame. After the film moves one frame, the shutter is ready to be released for the next exposure. This method of automatically advancing the film is repeated in an automatic film winding camera after each frame is exposed.

In the case of 135 millimeter films available on the market, a perforated film of the length for 12 frames, 24 frames or 36 frames is rolled in a cartridge. In a camera loaded with a cartridge containing a rolled 24 frame film, for example, there is an insufficient length of film beyond the 24th frame to permit the film to be advanced upon exposure of the 24th frame. Thus, the film becomes tensed up as the motor attempts to advance the film to the next frame when the shutter is released. Moreover, since winding the film becomes impossible, the motor becomes overloaded and receives an excess current.

In the conventional method for operating automatic film-rewinding cameras, the film rewind mechanism is controlled in such a manner that, when an excess current flowing into the rewind motor is detected, the motor is stopped, the connection between the motor and take-up spool 4 is interrupted, and cartridge spool 5 is then rotated in reverse.

Conventional methods for controlling automatic film rewinding, which depend on the detection of an abnormality in the film winding operation by detecting an excess current flowing into the winding motor, have several problems. For example, there have been many instances in which, immediately after detecting an abnormality such as a heavy load placed on the film winding mechanism for some reason other than reaching the end of the roll of film, the film is automatically rewound from that point. However, that point might be only halfway to the 24th frame and thus the rest of the film would remain unphotographed.

SUMMARY OF THE INVENTION

It is an object of the present invention to eliminate erroneous automatic rewinding of film in cameras having automatic mechanisms for advancing and rewinding film. The object can be accomplished in an automatic film rewinding method comprising the steps of: determining from the time being taken to advance a single frame of film, whether a first film winding abnormality is occurring; determining whether the abnormality is caused by a deterioration in the power source for the automatic film winding mechanism; determining from the time being taken to advance a single frame of film, whether a second film winding abnormality is occurring; determining whether the second winding abnormality is occurring coincidentally with the film being in the vicinity of the last frame of film on the film roll; and rewinding the film only upon determining that the second film winding abnormality is occurring coincidentally with the last frame of exposed film being in the vicinity of the last frame of film on the film roll.

BRIEF DESCRIPTION OF THE DRAWINGS

FIG. 1 shows a cross-sectional view of a camera of the type with which the present invention can be used;

Figure 4:
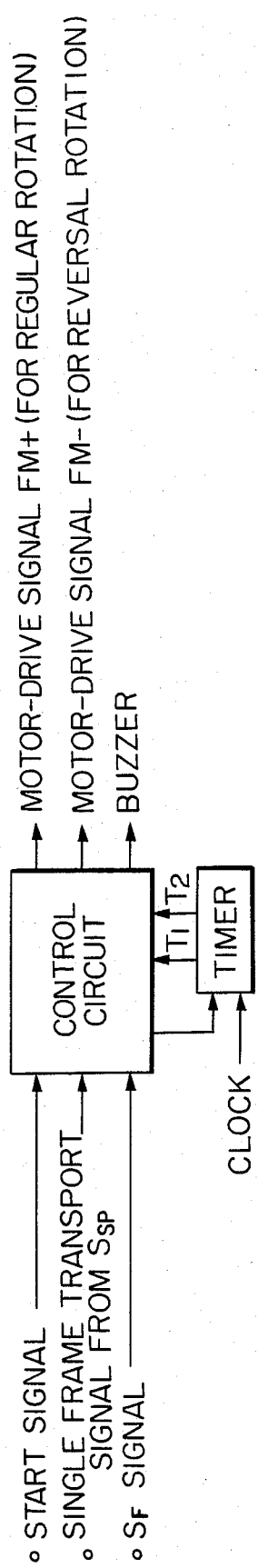
Figure 5:
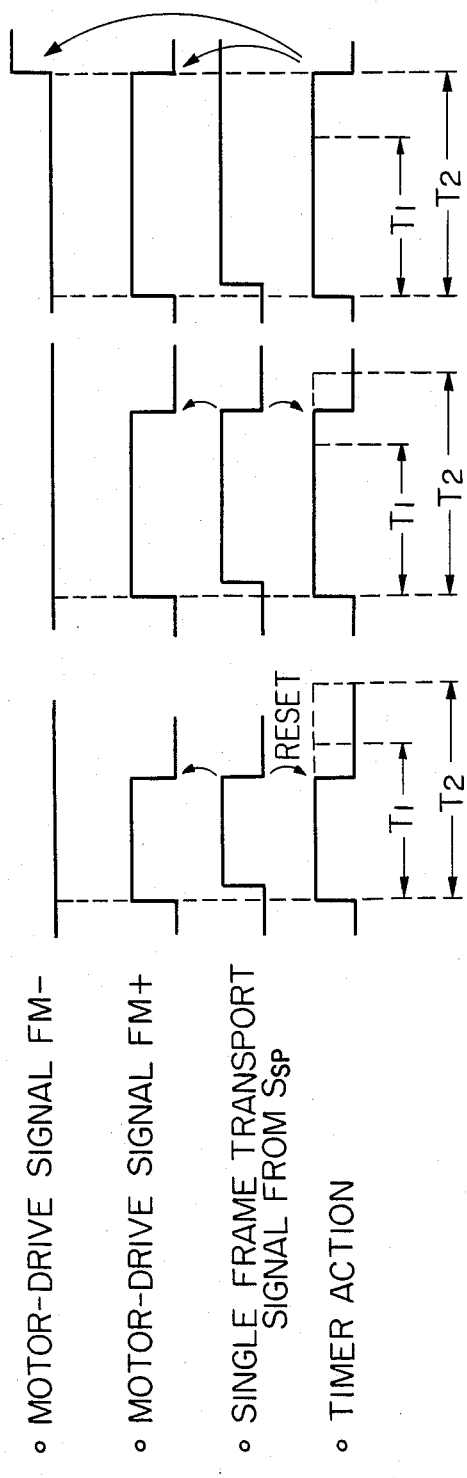
Figure 6:
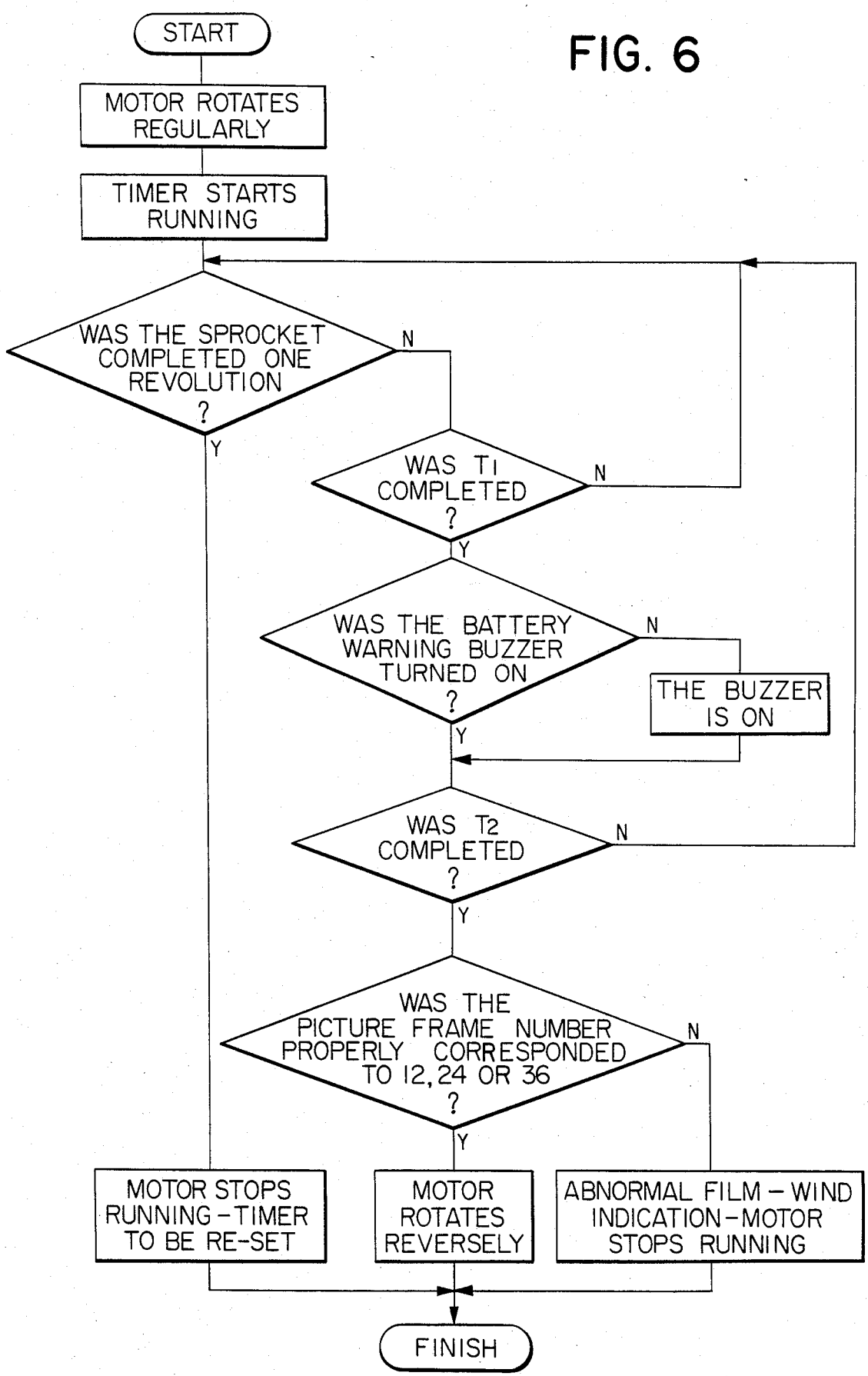

Each of FIGS. 2(a) and 2(b), shows, respectively, the structure and operation of a switch for a film frame counter;

FIG. 3 shows a switch for a sprocket section;

FIG. 4 is a block-diagram exhibiting a control-circuit of an example of the present invention;

FIGS. 5(1), 5(2) and 5(3) illustrate time-charts for the example of FIG. 4 during three different circumstances potentially encountered during operation of a camera of the type shown in FIG. 1; and FIG. 6 shows a flow-chart of the operation of the example of FIG. 4.

DETAILED DESCRIPTION OF THE PREFERRED EMBODIMENT

Referring now to the example given for the detailed description of the invention, FIG. 2(a) shows a circular, film frame counter 6 and a microswitch $S_F$ associated with the film frame counter, in accordance with the invention, so as to be turned OFF at each of the cam notches formed in the circumference of film frame counter 6. The cam notches are arranged in two or three positions of the frame counter so as to correspond to the last frame numbers of conventionally available rolls of film, for example, the 12th, 24th and 36th frames. In this way the film frame counter and microswitch $S_F$ are capable of indicating the last frame of a film having a specific length. Switch $S_F$ is turned OFF when the frame counter indicates 12, 24, 36 or the vicinity thereof, as shown in FIG. 2(b). Otherwise switch $S_F$ is turned ON.

In the case of a camera loaded with a film cartridge of 24 frames, there may be instances in which only 24 frames of pictures can be photographed. However, depending upon how the roll of film is loaded into the cartridge, there may also be other instances in which 25 frames can be photographed. Thus, switch $S_F$ is so arranged as to be turned OFF when the frame counter indicates approximately 24 frames, so that photographing a 25th exposure is not precluded using applicant's method, as will be understood more fully from the description below.

FIG. 3 shows a sprocket 3' and a microswitch $S_{SP}$ arranged near the circumference of sprocket 3'. A cam 31 is provided on the axis of sprocket 3', and sprocket 3' makes one complete revolution for each frame advanced. Thus, as each film frame is wound up, sprocket 3' and switch $S_{SP}$ operate to generate a signal corresponding to the advancing of each frame.

FIG. 4 is a block diagram showing a control circuit controlled in accordance with the method of the present invention by a built-in microcomputer of a motor-driven, automatic film winding camera.

FIG. 5 shows the time-charts of a film winding operation controlled in accordance with the method of the present invention for one frame. FIG. 5(1) shows a state in which a battery operates normally. FIG. 5(2) shows a state of camera winding operation in which the voltage has dropped due to the deterioration of a battery. FIG. 5(3) shows a state in which winding of the film is stopped before the last film frame has been advanced, and further winding has become impossible due to the tension of the film. FIG. 6 shows an operation program of the control circuit.

As the shutter of a motor-driven automatic film winding camera, such as shown in FIG. 1, is released and an exposure is completed, the control circuit transmits a start signal to the timer and a motor-drive signal for regular rotation (FM+) is transmitted from the control circuit to the motor. Then, take-up spool 4 is rotated by the motor in accordance with the motor-drive signal for regular rotation (FM+) and film F begins to advance in the direction in which film F is taken up by take-up spool 4. In accordance with the present invention, when sprocket 3' starts to rotate, then microswitch $S_{SP}$ of sprocket 3' is in the OFF position. The timer is activated by the control circuit start signal and signals have transmitted to the control circuit from the timer when prescribed periods $T_1$, $T_2$, described below, have elapsed.

Prescribed period $T_1$ is set a little longer than a period $T_0$, which is the period required for winding a frame of film when the battery voltage is normal. Period $T_1$ is used to detect the deterioration of a battery. Whenever the control circuit determines that the period required for winding a single frame becomes longer than prescribed period $T_1$, the control circuit sounds a warning buzzer to indicate battery deterioration. Preferably $T_1$ should be calibrated to be longer than $T_0$ by 30% of $T_0$.

Prescribed period $T_2$ is set to detect the completion of photographing the last frame of a film roll and thus is several times longer than period $T_0$. Whenever the control circuit determines that the period required for winding one frame becomes longer than prescribed period $T_2$, the control circuit stops the motor. This occurs when the control circuit receives a $T_2$ signal from the timer without receiving a film frame advance signal from switch $S_{SP}$. In effect, the control circuit judges that the film is being stretched because the film is not being wound and thus the control circuit signals the motor to stop winding the film. If the film winding has been stopped because $T_2$ has been received by the control circuit without a signal from switch $S_{SP}$ and an OFF signal also is transmitted from microswitch $S_F$ to the control circuit, then a motor driving signal for a reverse motor rotation is transmitted to the motor by the control circuit. However, if a $T_2$ signal is transmitted to the control circuit from the timer before the control circuit receives a signal from switch $S_{SP}$ and an ON signal is being transmitted from switch $S_F$ to the control circuit, then the control circuit stops the motor and sounds a warning buzzer to indicate the occurrence of a malfunction.

In the example, periods, $T_1$, $T_2$ were prescribed as 1.5 sec., 3 sec., respectively, and the one frame winding period $T_0$ was 1.1 sec.

When sprocket 3' is rotated forward one revolution in accordance with a motor-drive signal FM+ received by the motor and one frame of a film roll is wound up by sprocket 3', microswitch $S_{SP}$ transmits a single-frame transporting signal to the control circuit which responds by stopping the motor. When the period between the moment of start signal transmission and the moment of single-frame transporting signal transmission is shorter than prescribed period $T_1$ for giving a warning of battery deterioration, the control circuit judges that the battery and the film winding are operating properly, and thus no battery deterioration warning is given. The timer is then reset and the control circuit will check the elapsed time again when the next frame of film is advanced. [Refer to FIG. 5(1).]

When the period from the moment of a start signal transmission to the moment of a single frame transport signal transmission is longer than prescribed period $T_1$ for giving a warning of battery deterioration and is shorter than prescribed period $T_2$, the control circuit judges that a battery is deteriorated and gives a warning of battery deterioration; for example, a buzzer is sounded. [Refer to FIG. 5(2).]

When a motor driving signal FM+ for forward rotation is transmitted from the control circuit to the motor after the control circuit receives a start signal, the motor rotates and a single frame of film is wound up. When prescribed period $T_2$ elapses before the one frame is wound up completely, the control circuit judges that the film winding is stopped and the motor is unable to wind up the film and that further operation of the motor during this condition will cause the film to become stretched. If this condition occurs when an OFF signal is transmitted from microswitch $S_F$ to the control circuit, the control circuit judges that all the film frames of a film roll loaded in a cartridge were photographed, and thus transmits a reverse motor-drive signal FM− to cause the motor to reverse its regular rotation, disconnects the motor from take-up spool 4 and also rotates cartridge spool 5 clockwise to rewind the film into the cartridge. [Refer to FIG. 5(3).] However, if prescribed period $T_2$ elapses before switch $S_{SP}$ indicates that another frame of film is wound up and an ON signal is transmitted from microswitch $S_F$ to the control circuit, the control circuit judges that a malfunction has occurred, stops the motor and gives a warning (by a buzzer) at the same time.

The operations described above are performed in accordance with the program exhibited in a flow chart shown in FIG. 6. As is understood from the flow chart, the film wind-rewind device performs the following four operations:

(1) The motor starts to rotate until the sprocket is rotated once within a period $T_1$, and then the motor stops rotating.

(2) The motor starts rotating until the sprocket rotates once within a period longer than the period $T_1$, but shorter than a period $T_2$, and a buzzer sounds to warn of the deterioration of the battery. In this case, the camera remains operative to take photographs notwithstanding the battery deterioration warning, because the sprocket rotates to advance one frame of film in the film roll.

(3) The sprocket fails to rotate once within period $T_2$ in spite of the rotation of the motor. The motor is stopped and an abnormality in the winding of the film is indicated.

(4) The motor is rotated in reverse and the roll of film is rewound when the conditions described above in (3) occur in the vicinity of the last frame of the film roll, such as the 12th, 24th or 36th frame.

Heretofore, the method for automatically rewinding a roll of film upon detecting an abnormality in the film advance has resulted in such malfunctions as the film being rewound from the middle of a film roll and the like. The present invention accomplishes an automatic rewinding of a roll of film by making judgments based on information obtained through a switch arranged so as to be turned ON and OFF in the vicinity of the position of the last frame number of a roll of film loaded in a camera. In the present invention, when a film winding abnormality is detected, the reading of the film frame counter switch is checked to determine if the last frame has been advanced, before rewinding is initiated. In this way, the present invention prevents the film from being automatically rewound from the middle of the roll of film and improves the reliability of the results obtained using an automatic rewinding mechanism.

The film roll's last frame number, such as 12, 24, or 36, can be set by using a switch and a frame counter, as in the above example, or by storing the frame number in a memory device of the camera. The last frame number also may be set by hand when film is loaded into the camera by a user. Moreover it is also possible to detect the last frame number when a film cartridge is loaded into a camera, provided that the film cartridge is notched in advance to correspond to the last frame number, such as 12, 24 or 36, of the film loaded therein.

In the particular example described above, the necessary information for determining whether to initiate rewinding of the film is taken from a film winding period. In this way it is possible to differentiate abnormalities occurring during winding of the film. Moreover, as stated above, the present invention may also be practiced using other detecting means or other necessary information combined therewith.

What is claimed is:

1. A method for automatically rewinding the film in a camera having a battery-powered automatic film rewinder, the method comprising the steps of:
   (a) detecting a phenomenon in which a frame of film is not being advanced normally;
   (b) determining whether the film is not advancing normally because of battery deterioration;
   (c) determining whether the frame number of the film being advanced corresponds to a specific frame number of the film; and
   (d) rewinding the film only if the film is not advancing normally and the frame number of the film being advanced corresponds to a predetermined number.

2. A method as in claim 1, wherein a film rewind commanding signal is given upon determining that the film is not advancing normally and that the frame number of the film being advanced is coincident with a predetermined number.

3. A method for automatically rewinding film in a camera as in claim 1, wherein said predetermined number designates the number of the last frame of all the photographable frames of a film roll in the camera.

4. A method for automatically rewinding film in a camera as in claim 1, wherein said predetermined number designates the number of one of several frames including the very last frame and several frames after said last frame.

5. A method for automatically rewinding film in a camera as in claim 1, wherein said predetermined number designated the number of one of several frames including the very last frame and several frames before and after said last frame.

6. A method for automatically rewinding film in a camera as in claim 1, wherein said predetermined number is loaded in by a film cartridge which is notched correspondingly to the last frame number of the film loaded therein.

7. A method for controlling an automatic film winding and rewinding mechanism in a camera to rewind the film only after the maximum number of frames on the film have been exposed, the method comprising the steps of:
   (a) determining whether a first film winding abnormality is occurring by determining whether the time period for advancing a single frame of film is longer than a first predetermined time period;
   (b) upon determining that a first abnormality is occurring, next determining whether said first abnormality is caused by a deterioration in the power source for the automatic film winding mechanism;
   (c) determining whether a second film winding abnormality is occurring by determining whether a second time period, said second period being longer than said first period, elapses without completing the advancing of a single frame of film;
   (d) upon determining that a second abnormality is occurring, next determining whether said second winding abnormality is occurring coincidentally with the film being in the vicinity of the last frame of film on the film roll; and
   (e) rewinding the film only upon determining that said second film winding abnormality is occurring coincidentally with the film being in the vicinity of the last frame of film on the film roll.

8. A method for controlling a camera's automatic film winding and rewinding mechanism to rewind the film only after the maximum number of film frames have been exposed, the mechanism including a battery-powered motor for winding and rewinding camera film, a control circuit, timing means, a single-film-frame-advance detector and an end-of-film-roll detector, the method comprising the steps of:
   (a) monitoring by the control circuit whether the timing means transmits a first timing signal corresponding to a first predetermined time period elapsing after transmission of a start signal from the control circuit to the timing means, before the control circuit receives a signal from the single-film-frame-advance detector indicating one frame of film has advanced past the camera shutter opening;
   (b) monitoring by the control circuit whether the timing means transmits a second signal corresponding to a second time period, said second period being longer than said first period, elapsing after transmission of said start signal, before the control circuit receives a signal from the single-film-frame-advance detector;
   (c) monitoring by the control circuit whether an end-of-film-roll signal is being transmitted from the end-of-film-roll detector; and
   (d) transmitting a signal from the control circuit to the motor to rewind the film only upon detecting said second timing signal and said end-of-film-roll signal.

* * * * *